(12) United States Patent
Goering et al.

(10) Patent No.: US 9,151,418 B2
(45) Date of Patent: Oct. 6, 2015

(54) TEMPERATURE-CONTROLLABLE PIPE

(75) Inventors: Rainer Goering, Borken (DE); Andreas Dowe, Borken (CF); Karl Kuhmann, Duelmen (DE); Maximilian Gruhn, Marl (DE); Juergen Franosch, Marl (DE)

(73) Assignee: Evonik Degussa GmbH, Essen (DE)

( * ) Notice: Subject to any disclaimer, the term of this patent is extended or adjusted under 35 U.S.C. 154(b) by 268 days.

(21) Appl. No.: 13/457,634

(22) Filed: Apr. 27, 2012

(65) Prior Publication Data
US 2012/0275774 A1 Nov. 1, 2012

(30) Foreign Application Priority Data

Apr. 29, 2011 (DE) .......................... 10 2011 017 811

(51) Int. Cl.
*H05B 3/58* (2006.01)
*F16L 11/12* (2006.01)
*F16L 11/08* (2006.01)

(52) U.S. Cl.
CPC ............... *F16L 11/12* (2013.01); *F16L 11/086* (2013.01); *Y10T 29/49083* (2015.01)

(58) Field of Classification Search
CPC ... A47J 31/545; A47J 31/542; A47J 31/0573; H05B 3/00; H05B 2203/02; H05B 3/746; H05B 6/64649; H01B 1/128; H01B 1/127; H01B 1/24; H01B 1/22
USPC ...................... 219/535; 392/502, 466; 138/33
See application file for complete search history.

(56) References Cited

U.S. PATENT DOCUMENTS

| | | | | |
|---|---|---|---|---|
| 3,764,779 A | * | 10/1973 | Kadoya et al. | 219/201 |
| 4,616,125 A | * | 10/1986 | Oppitz | 219/553 |
| 4,874,925 A | | 10/1989 | Dickenson | |
| 4,921,018 A | | 5/1990 | Dridi et al. | |
| 5,307,842 A | | 5/1994 | Lequeux | |
| 5,428,706 A | | 6/1995 | Lequeux | |
| 5,544,275 A | * | 8/1996 | Ebbing et al. | 392/480 |
| 5,993,696 A | * | 11/1999 | Hanhi et al. | 252/500 |

(Continued)

FOREIGN PATENT DOCUMENTS

| | | |
|---|---|---|
| EP | 2 103 856 A1 | 9/2009 |
| EP | 2 184 524 A2 | 5/2010 |

(Continued)

OTHER PUBLICATIONS

American Petroleum Institute, API Recommended Practice 17B, "Recommended Practice for Flexible Pipe", Third Edition, Mar. 2002, pp. 1-152.

(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

A flexible pipe of multilayer structure which comprises the following layers, from the inside to the outside: an interior lining; an inner reinforcement layer; a layer of molded electrically conductive plastic; an outer reinforcement layer; and an exterior sheath. The electrically conductive plastic layer is in electrical contact with the two reinforcement layers, and the two reinforcement layers can be connected to a source of electrical current. It is thus possible to achieve efficient heating of the pipe, and it can therefore be used for conveying oil in cold regions.

16 Claims, 1 Drawing Sheet

(56) References Cited

U.S. PATENT DOCUMENTS

| | | | |
|---|---|---|---|
| 6,085,799 | A | 7/2000 | Kodaissi et al. |
| 6,090,459 | A * | 7/2000 | Jadamus et al. ............ 428/36.4 |
| 6,102,077 | A | 8/2000 | Legallais et al. |
| 6,123,114 | A | 9/2000 | Seguin et al. |
| 6,227,250 | B1 | 5/2001 | Coutarel |
| 6,283,160 | B1 | 9/2001 | Hardy et al. |
| 6,316,537 | B1 | 11/2001 | Baumann et al. |
| 6,409,942 | B1 * | 6/2002 | Narkis et al. .................. 252/511 |
| 6,656,997 | B2 | 12/2003 | Baumann et al. |
| 6,793,997 | B2 * | 9/2004 | Schmitz ....................... 428/36.9 |
| 6,946,627 | B2 * | 9/2005 | Thomassen ................... 219/535 |
| 7,203,419 | B2 * | 4/2007 | Malone et al. ................ 392/468 |
| 7,804,044 | B2 * | 9/2010 | Diemer et al. ............... 219/217 |
| 8,697,814 | B2 | 4/2014 | Dowe et al. |
| 2002/0100516 | A1 | 8/2002 | Powell et al. |
| 2006/0134419 | A1 * | 6/2006 | Monsheimer et al. ........ 428/402 |
| 2010/0009106 | A1 * | 1/2010 | Dowe et al. |
| 2010/0126986 | A1 | 5/2010 | Günzing et al. |
| 2010/0288181 | A1 * | 11/2010 | Ersoy et al. ..................... 116/98 |
| 2010/0300573 | A1 | 12/2010 | Dowe et al. |
| 2011/0209768 | A1 | 9/2011 | Dowe et al. |
| 2012/0006465 | A1 | 1/2012 | Dowe et al. |
| 2012/0199317 | A1 | 8/2012 | Hartmann et al. |
| 2012/0279577 | A1 | 11/2012 | Goering et al. |
| 2013/0025734 | A1 | 1/2013 | Kuhmann et al. |
| 2013/0025735 | A1 | 1/2013 | Kuhmann et al. |
| 2013/0032239 | A1 | 2/2013 | Kuhmann et al. |
| 2013/0032240 | A1 | 2/2013 | Kuhmann et al. |
| 2013/0171388 | A1 | 7/2013 | Pawlik et al. |
| 2013/0294757 | A1 * | 11/2013 | Westmeier et al. ........... 392/468 |

FOREIGN PATENT DOCUMENTS

| | | |
|---|---|---|
| GB | 2065430 | 6/1981 |
| WO | WO 81/01227 A1 | 4/1981 |
| WO | WO 85/04941 | 11/1985 |
| WO | WO 91/18231 | 11/1991 |
| WO | WO 92/11487 | 7/1992 |
| WO | WO 97/20162 | 6/1997 |
| WO | WO 00/66934 | 11/2000 |
| WO | WO 00/66935 | 11/2000 |
| WO | WO 01/07824 | 2/2001 |
| WO | WO 01/61232 | 8/2001 |
| WO | WO 2006/090182 | 8/2006 |
| WO | WO 2006/097765 | 9/2006 |
| WO | WO 2008/005829 | 1/2008 |

OTHER PUBLICATIONS

American Petroleum Institute, API Specification 17J, "Specification for Unbonded Flexible Pipe", Second Edition, Nov. 1999, Errata, May 25, 2001, Addendum 1, Jun. 2002, Effective Date: Dec. 2002, pp. 1-45.

U.S. Appl. No. 13/892,534, filed May 13, 2013, Goering, et al.

European Search Report Issued Sep. 27, 2012 in Patent Application No. 12162828.3 (with English translation of Categories of Cited Documents).

U.S. Appl. No. 14/224,807, filed Mar. 25, 2014, Franosch, et al.

U.S. Appl. No. 14/225,842, filed Mar. 26, 2014, Dowe, et al.

* cited by examiner

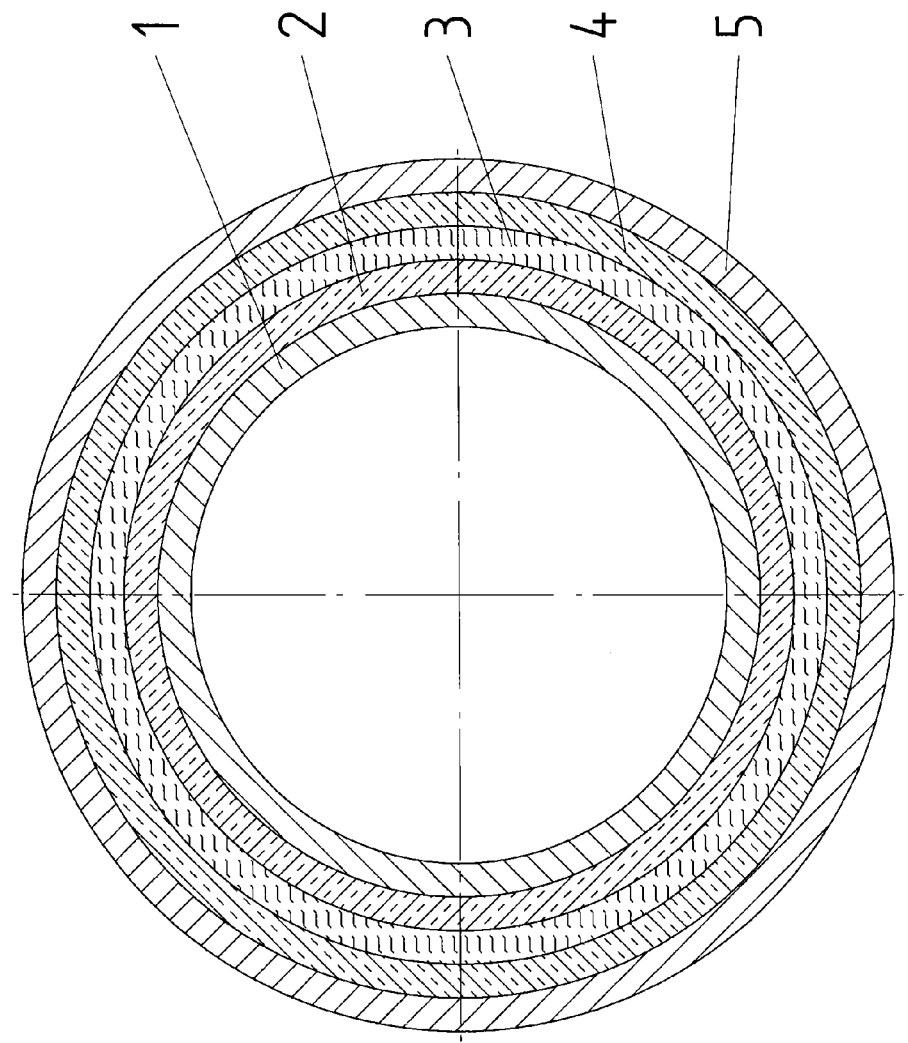

TEMPERATURE-CONTROLLABLE PIPE

CROSS REFERENCE TO RELATED APPLICATIONS

This application claims priority to German Application No. 102011017811.2, filed Apr. 29, 2011, the disclosure of which is incorporated herein by reference in its entirety.

BACKGROUND OF THE INVENTION

Field of the Invention

The present invention relates to a temperature-controllable, flexible pipe of multilayer structure with unbonded layers. For simplicity, the term "unbonded flexible pipe" is used hereinafter to describe this type of pipe. The unbonded flexible pipe according to the present invention has high resistance to the diffusion of gases from a conveyed fluid, and may therefore be used for conveying liquid or gaseous media, and may be employed with particular advantage for conveying crude oil or natural gas.

Unbonded flexible pipes per se are conventionally known. Pipes of this type comprise an interior lining, usually in the form of a plastics pipe, as barrier to the escape of the conveyed fluid, and also comprise one or more reinforcement layers on the external side of the interior lining. The conventional unbonded flexible pipe can comprise additional layers, for example one or more reinforcement layers on the internal side of the interior lining, in order to prevent collapse of the interior lining under high external pressure. This type of interior reinforcement is usually termed a carcass. An exterior sheath may moreover be present, in order to provide a barrier to ingress of liquid from the exterior environment into the reinforcement layers or other inner polymeric or metallic functional layers. In many instances, a thermoplastics layer, for example in the form of wound "anti-wear tapes", is introduced between the exterior reinforcement layers in order to prevent abrasion on the metal structure due to friction.

Typical unbonded flexible pipes have been described by way of example in WO 01/61232, U.S. Pat. No. 6,123,114 and U.S. Pat. No. 6,085,799; they have moreover been characterized in more detail in API Recommended Practice 17B "Recommended Practice for Flexible Pipe", 3rd Edition, March 2002, and in API Specification 17J "Specification for Unbonded Flexible Pipe" 2nd Edition, November 1999.

The term "unbonded" means in the context of the present invention that at least two of the layers, inclusive of reinforcement layers and plastics layers, have been designed without bonding to one another. In practice, the pipe comprises at least two reinforcement layers which over the length of the pipe have no bonding to one another, either directly or indirectly, i.e. by way of other layers. The pipe can therefore be bent, and is flexible enough to be rolled up for transport purposes.

Unbonded flexible pipes of this type may be used in various embodiments in offshore applications and in various onshore applications for the transport of liquids, gases and slurries. By way of example, they can be used for the transport of fluids where very high or very different water pressure prevails over the length of the pipe, by way of example taking the form of risers which run from the ocean floor up to equipment at or in the vicinity of the ocean surface, and they can also generally be used as pipes for the transport of liquids or gases between various items of equipment, or as pipes laid at great depth on the ocean floor, or as pipes between items of equipment close to the ocean surface.

The reinforcement layer(s) in conventional flexible pipes is/are mostly composed of helically arranged steel wires, steel profiles, or steel tapes, where the individual layers have been formed with various winding angles relative to the axis of the pipe.

In conventional flexible pipes, the interior lining is usually composed of a polyolefin, such as polyethylene, which may also have been crosslinked, of a polyamide, such as PA11 or PA12, or of polyvinylidene fluoride (PVDF). Single- or multilayer linings optionally comprising layers made of other materials are conventionally utilized.

At temperatures below about 40° C., constituents such as waxes and hydrates may precipitate out from crude oil. Such precipitation is particularly problematic because it reduces the cross-sectional area of the pipe. In order to prevent this problem heatable pipes have been employed to provide the transport function even when temperatures are low.

WO 91/18231 describes a heatable flexible pipe system which comprises electrically conductive cables which have been connected to an electrically conductive source of current and generate heat by the principle of resistance heating. Disadvantages of this concept are complicated design and irregularity of temperature control over the entire length.

WO 97/20162 describes a flexible pipe system where a flexible interior pipe is surrounded by a plurality of smaller pipes. These can be utilized for the transport of process media or current. Another conceivable method for temperature-control of the pipe system would use passage of a temperature-controlled medium. The disadvantages of this concept are likewise complicated design, heat losses, and irregular temperature-control over the entire length.

Other applications (WO 92/11487, WO 85/04941, WO 2000/66934, WO 2000/66935 and WO 2001/07824) employ thermal insulation as a passive method of stabilization of the temperature of the media. However, when such structures are employed for transport at great depth under water, the insulation effect is reduced due to the compressibility of the foamed structures under the high external pressure associated therewith.

WO 2006/097765, WO 2006/090182 and U.S. Pat. No. 4,874,925 describe an alternative heating method which involves a multilayer pipe in which two conductors are present, embedded in a conductive layer and displaced by 180° with respect to one another along the pipe. Current flowing from one conductor to the other causes heating within the conductive layer. An important factor for uniform heating is connection to, or uniform contact of the conductor with, the conductive layer. The conductive layer has external thermal and optionally electrical insulation. An advisable or necessary feature is an additional layer inside towards the crude oil, for electrical insulation.

WO 2008/005829 describes heatable pipes for use in the automobile sector. The heatable pipes comprise an electrically conductive polymer layer which acts as a resistance heating system.

SUMMARY OF THE INVENTION

The object of the invention consists in providing a flexible pipe of multilayer structure in which the conveyed medium can be electrically heated, while the structure is not significantly more expensive. It should be possible here to heat the pipe in a targeted manner only in the pipe sections where this is specifically required.

This and other objects have been achieved according to the present invention, the first embodiment of which provides a flexible pipe, comprising:

a capability for generating heat; and a multilayer structure, wherein the multilayer structure comprises, in order from the inside to the outside of the multilayer structure:

an interior lining;
an inner reinforcement layer;
a layer of molded electrically conductive plastic;
an outer reinforcement layer; and
an exterior sheath;

wherein the inner and outer reinforcement layers comprise metal, the molded electrical conductive plastic layer is in electrical contact with the inner and outer reinforcement layers, and the flexible pipe is optionally heated by connection of the inner and outer reinforcement layers to a source of electrical current and passing electrical current through the reinforcement layers.

In preferred embodiments of the invention the interface between the electrically conductive molded plastic layer and the inner reinforcement layer is free of bonding or the interface between the electrically conductive molded plastic layer and the outer reinforcement layer is free of bonding or both interfaces are free of bonding.

In a further preferred embodiment, the electrically conductive molded plastic layer comprises at least one selected from the group consisting of conductive carbon black, graphite fibrils and graphite powder.

In another preferred embodiment, the volume resistivity of the electrically conductive molded plastic is from $10^{-3}$ $\Omega$m to $10^{10}$ $\Omega$m.

BRIEF DESCRIPTION OF THE SEVERAL VIEWS OF THE DRAWINGS

FIGURE: An exemplary flexible pipe according to the invention, which includes: an interior lining 1; an inner reinforcement layer 2; a layer of molded electrically conductive plastic 3; an outer reinforcement layer 4; and an exterior sheath 5.

DETAILED DESCRIPTION OF THE PREFERRED EMBODIMENTS

The flexible pipe according to the present invention comprises the following layers, in order from the inside to the outside:

an interior lining;
an inner reinforcement layer;
a layer of molded electrically conductive plastic;
an outer reinforcement layer; and
an exterior sheath.

The layer of molded electrically conductive plastic is in electrical contact with the two reinforcement layers, and the two reinforcement layers may be connected to a source of electrical current. The two reinforcement layers preferably comprise connections for this purpose.

The interior lining may usually be a plastics pipe which provides a barrier to escape of the fluid conveyed. This pipe may, as a function of performance requirements, comprise a single layer or optionally may be composed of a plurality of layers made of respectively different molding compositions, for example, a two-layer, three-layer, or four-layer system, or in particular instances even more layers.

In another embodiment, the interior lining may be composed of a corrugated, thin-walled metal pipe.

The reinforcement layers may be composed of helically arranged steel wires, steel profiles or steel tapes, as conventionally constructed. It is preferable that the structure of at least one of these reinforcement layers is such that it withstands the internal pressure, and that the structure of at least one other of these reinforcement layers is such that it withstands tensile forces. More than two reinforcement layers may be present in the flexible pipe according to the present invention. Adjacent to the outermost reinforcement layer is an exterior sheath, usually in the form of a pipe or flexible tube made of a thermoplastic molding composition or made of an elastomer.

In one possible embodiment, a carcass may be present on the interior side of the inner lining of the unbonded flexible pipe. These carcasses and design thereof are prior art. In another possible embodiment, the unbonded flexible pipe comprises no carcass, especially when it is not intended for operation under high external pressures.

The layer made of an electrically conductive plastics moulding composition which according to the invention has been arranged between two reinforcement layers may be extruded onto the interior of the two reinforcement layers, for example by wrapping extrusion, or may have been formed by winding to apply a prefabricated tape. In a preferred embodiment the interface between the electrically conductive molded plastic layer and the inner reinforcement layer is free of bonding. In another preferred embodiment, the interface between the electrically conductive molded plastic layer and the outer reinforcement layer is free of bonding. In a particularly preferred embodiment, both the interface between the electrically conductive molded plastic layer and the inner reinforcement layer and the interface between the electrically conductive molded plastic layer and the outer reinforcement layer are free of bonding.

In individual instances, the unbonded flexible pipe may optionally comprise a plurality of these layers made of an electrically conductive plastics molding composition, in each case between two reinforcement layers.

Suitable materials for the electrically conductive plastics molding composition may be molding compositions based on olefinic polymers, on polyamides, on fluoropolymers, on polyethylene 2,6-naphthalate, on polybutylene 2,6-naphthalate, on polyphenyl sulphone, on polyarylene ether ketones, on polyphenylene sulphide, or on a polyarylene ether ketone/polyphenylene sulphide blend.

The olefinic polymer used for the electrically conductive plastics moulding composition may firstly be a polyethylene, in particular a high-density polyethylene (HDPE), or an isotactic or syndiotactic polypropylene. The polypropylene may be a homo- or copolymer, for example with ethylene or 1-butene as comonomer. Such copolymers may optionally be random or block copolymers. The polypropylene may be impact-modified, for example, with ethylene-propylene rubber (EPM) or EPDM. Syndiotactic polystyrene which may also be used according to the invention may be produced in a known manner by metallocene-catalysed polymerization of styrene.

The polyamide used for the electrically conductive plastics molding composition may be produced from a combination of diamine and dicarboxylic acid, from an co-aminocarboxylic acid, or from the corresponding lactam. In principle it may be possible to use any polyamide, for example PA6 or PA66. In one preferred embodiment, the monomer units of the polyamide comprise on average at least 8, preferably at least 9, and most preferably at least 10 carbon atoms. In the case of mixtures of lactams, the arithmetic average may be considered. In the case of a combination of diamine and dicarboxylic acid, the arithmetic average of the number of carbon atoms of diamine and dicarboxylic acid in this preferred embodiment must be at least 8, preferably at least 9 and most preferably at least 10. Examples of suitable polyamides are: PA610 (which may be produced from hexamethylenediamine [6 carbon atoms] and sebacic acid [10 carbon atoms], the average number of carbon atoms in the monomer units here therefore being 8), PA88 (which may be produced from octamethylenediamine and 1,8-octanedioic acid), PA8 (which may be produced from caprylolactam), PA612, PA810, PA108, PA9, PA613, PA614, PA812, PA128, PA1010, PA10, PA814, PA148, PA1012, PA11, PA1014, PA1212 and PA12. It may also be possible, of course, to use copolyamides based on these materials, and it may also be optionally possible here to make concomitant use of monomers such as caprolactam.

Advantageously, it may also be possible to use, as polyamide, a semiaromatic polyamide in which from 5 to 100 mol % of the dicarboxylic acid content derives from aromatic dicarboxylic acid having from 8 to 22 carbon atoms and which has a crystallite melting point $T_m$ of at least 260° C., preferably of at least 270° C. and particularly preferably of at least 280° C. These polyamides are usually described as PPA and may be produced from a combination of diamine and dicarboxylic acid, optionally with addition of an co-aminocarboxylic acid or of the corresponding lactam. Examples of suitable types include PA66/6T, PA6/6T, PA6T/MPMDT (MPMD stands for 2-methylpentamethylenediamine), PA9T, PA10T, PA11T, PA12T, PA14T and also copolycondensates of these last types with an aliphatic diamine and with an aliphatic dicarboxylic acid or with an co-aminocarboxylic acid or, respectively, a lactam.

The molding composition may additionally comprise further components, e.g. impact modifiers, other thermoplastics, plasticizers and other conventional additives, with the proviso that the polyamide forms the matrix of the molding composition.

The fluoropolymer used for the electrically conductive plastics molding composition may be a polyvinylidene fluoride (PVDF), an ethylene-tetrafluoroethylene copolymer (ETFE), an ETFE modified with a tercomponent such as propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a chlorotrifluoroethylene-perfluorinated alkyl vinyl ether-tetrafluoroethylene copolymer (CPT), a tetrafluoroethylene-hexafluoropropene copolymer (FEP) or a tetrafluoroethylene-perfluorinated alkyl vinyl ether copolymer (PFA). It may also be possible to use copolymers based on vinylidene fluoride which comprise up to 40% by weight of other monomers, examples being trifluoroethylene, chlorotrifluoroethylene, ethylene, propene and hexafluoropropene.

Polyphenyl sulphone (PPSU) may be produced by Solvay Advanced Polymers under trade mark Radel®. It can be produced by nucleophilic substitution from 4,4'-dihydroxybiphenyl and 4,4'-dihydroxydiphenyl sulphone. Another particular suitable material may be a PPSU/fluoropolymer blend, for example a PPSU/PTFE blend.

The polyarylene ether ketone which may be used comprises units of the formulae (—Ar—X—) and (—Ar'—Y—), where Ar and Ar' are a divalent aromatic moiety, preferably 1,4-phenylene, 4,4'-biphenylene, or else 1,4-, 1,5- or 2,6-naphthylene. X is an electron-withdrawing group, preferably carbonyl or sulphonyl, while Y is another group, such as O, S, CH$_2$, isopropylidene or the like. At least 50%, preferably at least 70% and particularly preferably at least 80% of the groups X here are a carbonyl group, while at least 50%, preferably at least 70% and particularly preferably at least 80% of the groups Y may be composed of oxygen.

In a preferred embodiment, 100% of the groups X are carbonyl groups and 100% of the groups Y are oxygen. In this embodiment, the polyarylene ether ketone may be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups may naturally also be possible.

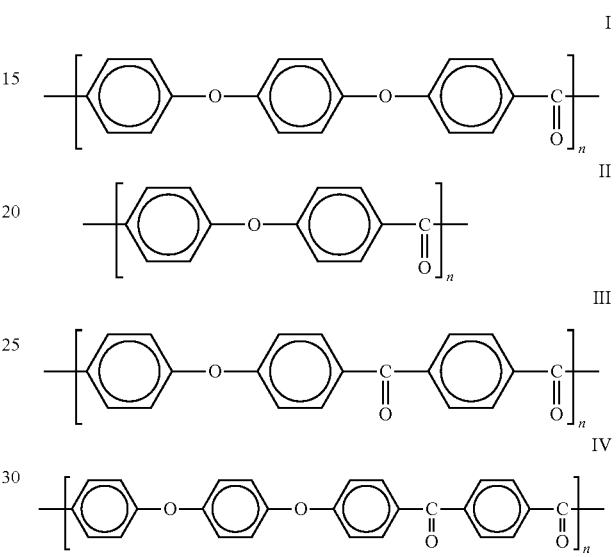

The polyarylene ether ketone may preferably be semicrystalline, and this may be seen in the DSC analysis where a crystallite melting point $T_m$ may be observed, the order of magnitude of which is in most instances around 300° C. or thereabove.

The polyphenylene sulphide used for the electrically conductive plastics molding composition comprises units of the formula (—C$_6$H$_4$—S—);

and it may preferably be composed of at least 50% by weight of such units, more preferably at least 70% by weight and most preferably at least 90% by weight. The remaining units may be those listed above for the case of the polyarylene ether ketone, or tri- or tetra-functional branching units which result from the concomitant use of, for example, trichlorobenzene or tetrachlorobenzene during synthesis. Polyphenylene sulphide is available commercially in a wide variety of types or molding compositions.

In the case of the polyarylene ether ketone/polyphenylene sulphide blends, the two components may be present in any mixing ratio, and the range of constitution therefore continuously covers the entire range from pure polyarylene ether ketone to pure polyphenylene sulphide. The blend generally comprises at least 0.01% by weight of polyarylene ether ketone and, respectively, at least 0.01% by weight of polyphenylene sulphide.

The electrically conductive plastics molding composition may comprise conventionally known auxiliaries and additives. Optionally, the molding composition may contain other polymers. For example, the polyarylene ether ketone may contain fluoropolymers, such as PFA (a copolymer of tetrafluoroethylene and perfluorinated vinyl methyl ether), polyimide, polyetherimide, LCP, such as liquid-crystalline polyesters, polysulphone, polyether sulphone, polyphenyl sulphone, polybenzimidazole (PBI) or other high-temperature-resistant polymers. A polyphenylene sulphide may contain copolymers and, respectively, terpolymers of ethylene with polar comonomers. Further, a semiaromatic polyamide may contain an aliphatic polyamide. The polyamide molding composition may optionally also comprise at least one of a hydrolysis stabilizer, a plasticizer and impact modifiers. The molding composition may moreover comprise a lubricant, such as graphite, molybdenum disulphide, hexagonal boron nitride or PTFE. The proportion of the main polymers, or else, in the preferred case, the proportion of olefinic polymer, polyamide, fluoropolymer, polyethylene 2,6-naphthalate, polybutylene 2,6-naphthalate, polyphenyl sulphone, polyarylene ether ketone, polyphenylene sulphide or polyarylene ether ketone/polyphenylene sulphide blend in the molding composition may be at least 50% by weight, preferably at least 60% by weight, particularly preferably at least 70% by weight, with particular preference at least 80% by weight and very particularly preferably at least 90% by weight.

The electrical conductivity of this plastics molding composition may be achieved through addition of conductive carbon black, graphite powder and/or graphite fibrils. The volume resistivity to IEC 60093 of this plastics molding composition may be in the range from $10^{-3}$ to $10^{10}$ $\Omega$m, preferably in the range from $10^{-2}$ to $10^{8}$ $\Omega$m, particularly preferably in the range from $10^{-1}$ to $10^{7}$ $\Omega$m and with particular preference in the range from $10^{0}$ to $10^{6}$ $\Omega$m.

When the electrically conductive layer is applied by extrusion, its thickness may be about 0.05 to 50 mm, preferably from 0.1 to 20 mm, particularly preferably from 0.2 to 10 mm and with particular preference from 0.4 to 6 mm.

In another embodiment, a tape which is composed of the electrically conductive molding composition may be wound under tension onto the interior reinforcement layer, optionally fused and then covered with the exterior reinforcement layer in a manner that provides full-surface contact.

The width of the tape depends on the diameter of the pipe. Usual widths are in the range from about 20 mm to about 700 mm and preferably in the range from about 30 mm to about 500 mm and particularly preferably in the range from about 40 mm to about 300 mm. The thickness of the tape is subject to a restriction in that it must on the one hand have adequate mechanical stability and must on the other hand have sufficient flexibility to give a good result when wound. The thickness of the tape in practice may therefore be in the range from 0.05 mm to 5 mm and preferably in the range from 0.1 mm to 3 mm.

The cross section of the tape can be rectangular. However, there may also be recesses at the sides, so that the overlapping regions engage with one another and give the winding a surface that is in essence smooth.

It may also be possible to wind the tape with overlaps; an order of magnitude of about 10% of the width of the tape is sufficient for the overlapping region. However, it is also possible to wind a first sublayer of tape with edges abutted and optionally to wind thereover a second sublayer of tape likewise abutted but with displacement by about one half of the width of the tape.

After the winding process, the overlapping locations of the tape can be fused to one another. This may be achieved either by hot gas welding, by contact with a heating element or advantageously by irradiation with electromagnetic radiation in the UV, visible or IR spectral range. In principle, spot welding is sufficient to fix the tapes; however, preference may be given to continuous production of an uninterrupted welded seam. Another possibility, of course, may be that the full surfaces of the tapes are welded to one another in the overlapping regions.

The layer made of a conductive plastics molding composition may also simultaneously function as an anti-wear layer. Conventionally, anti-wear tapes are placed between the reinforcement layers made of steel, in order to prevent abrasion of the reinforcement layers. The primary result of this is abrasion of the tape. This abrasion must where appropriate be considered during design, in order to ensure that heating performance is adequate over the entire lifetime of the flexible pipe.

The two reinforcement layers adjacent to the electrically conductive plastics layer may be connected to a source of electrical current, and the reinforcement layers may serve as electrical conductors; the current then flows radially from one of the reinforcement layers to the other through the layer made of the electrically conductive plastics molding composition. The voltage to be applied may be calculated from the layer thickness, the electrical conductivity and the desired temperature. This embodiment has the advantage of ensuring, as a result of the production process, good large-surface-area contact between the layer made of the conductive plastics molding composition and the reinforcement layer situated thereover and, respectively, thereunder. This arrangement ensures good transmission of current and thus good heat yield.

When the molding composition comprises (conductive) carbon black, as electrically conductive additive, the heating system can utilize the PTC (positive temperature coefficient) effect. This effect may provide an intrinsic safety feature, since it restricts temperature increase at constant voltage, because conductivity falls as the system becomes hotter. This may prevent thermal degradation of the pipe or of the medium to be transported.

According to the invention, it may also be possible that the layer made of an electrically conductive plastics molding composition is placed only in specific sections of the pipe. It is possible to design the flexible pipe to be conductive in the region where specific heating is required, and to introduce in other regions of the pipe, where heating is not desired, a conventional anti-wear tape. It may be equally advantageous not to apply voltage to the entire length of the reinforcement layers but instead to concentrate attention only on the specific section of the pipe exposed to low temperatures. This may be achieved by way of directed, externally shielded current conductors which may be strategically integrated into the structure of the pipe.

The conductive layer and tapes may also be designed as a multilayer system. The externally oriented side can be composed of a contacting layer which has good electrical conductivity and which optionally also serves as a lubricating layer (anti-wear layer), this being followed towards the inside by a middle layer comprising electrically conductive fillers and designed appropriately for the desired temperature level and heating performance. The side facing inwards can then in turn be composed of a layer optimized in respect of electrical and thermal conductivity, and also with a view to lubrication performance and wear performance. This may solve the problem of the surface resistances of these foils, and also compensate for any possible contact losses due to the gaps between the metal tapes. The volume resistivity to IEC 60093 of the external layers with good conductivity may be, for example, about $10^{-3}$ to $10^{3}$ $\Omega$m, while the volume resistivity of the middle layer may be from $10^{-1}$ to $10^{8}$ $\Omega$m.

The flexible pipe may optionally further comprise unidirectionally reinforced or textile-reinforced polymer layers, and it may be possible in such embodiment to use carbon fibre reinforcement with good thermal conductivity, or an externally situated thermal insulation layer.

According to the present invention it may be possible to heat the pipe over its entire length or in selected sections, in order to prevent precipitation within the fluid being conducted through the pipe. Thermal degradation of the pipe system and of the transported medium may thus be avoided. Technical realization of the flexible pipe according to the invention is simple, since no complicated additional technical parts are needed, and the structure per se of the pipe is not altered. The pipe of the invention can therefore be heated efficiently to the extent that it can also be used for conveying oil in cold regions, for example in the Arctic.

The invention claimed is:

1. A flexible pipe, comprising:
a capability for generating heat; and
a multilayer structure, wherein the multilayer structure comprises, in order from the inside to the outside of the multilayer structure:
an interior lining;
an inner reinforcement layer;
a layer of molded electrically conductive plastic, wherein a volume resistivity of the molded electrically conductive plastic is from $10^{-3}$ Ωm to $10^{13}$ Ωm;
an outer reinforcement layer; and
an exterior sheath;
wherein the inner and outer reinforcement layers are comprised of helically arranged steel wires, steel profiles, or steel tapes,
wherein the molded electrically conductive plastic layer is in electrical contact with the inner and outer reinforcement layers,
wherein the inner and outer reinforcement layers are connected to a source of electrical current to pass electrical current through the reinforcement layers to heat the flexible pipe, and
wherein the layer of molded electrically conductive plastic is a wound layer formed by winding a prefabricated tape onto the inner reinforcement layer.

2. The flexible pipe according to claim 1, wherein the molded electrically conductive plastic layer comprises at least one polymer selected from the group consisting of an olefinic polymer, a polyamide, a fluoropolymer, a polyethylene 2,6-naphthalate, a polybutylene 2,6-naphthalate, a polyphenyl sulphone, a polyarylene ether ketone, a polyphenylene sulphide, and a blend of a polyarylene ether ketone and a polyphenylene sulphide.

3. The flexible pipe according to claim 1, wherein an interface between the molded electrically conductive plastic layer and the inner reinforcement layer is free of bonding.

4. The flexible pipe according to claim 1, wherein an interface between the molded electrically conductive plastic layer and the outer reinforcement layer is free of bonding.

5. The flexible pipe according to claim 1, wherein both an interface between the molded electrically conductive plastic layer and the inner reinforcement layer and an interface between the molded electrically conductive plastic layer and the outer reinforcement layer are free of bonding.

6. The flexible pipe according to claim 1, wherein the molded electrically conductive plastic layer comprises at least one selected from the group consisting of conductive carbon black, graphite fibrils and graphite powder.

7. The flexible pipe according to claim 1, wherein the molded electrically conductive plastic layer comprises multiple electrically conductive layers.

8. The flexible pipe according to claim 1, wherein the molded electrically conductive plastic layer comprises a multilayer system.

9. The flexible pipe according to claim 8, wherein the multilayer system comprises:
an externally oriented side comprising a contacting layer which has good electrical conductivity and which serves as an anti-wear layer;
a middle layer comprising electrically conductive fillers, which are set according to a specific temperature to be generated; and
a side facing inwards having electrical and thermal conductivity, and also being an anti-wear layer.

10. The flexible pipe according to claim 6, wherein the molded electrically conductive plastic layer comprises conductive carbon black and exhibits a positive temperature coefficient effect.

11. The flexible pipe according to claim 1, wherein a thickness of the molded electrically conductive plastic layer is from 0.05 to 50 mm.

12. The flexible pipe according to claim 2, wherein the molded electrically conductive plastic layer comprises an olefinic polymer selected from the group consisting of polyethylene, a high-density polyethylene (HDPE), an isotactic polypropylene, a syndiotactic polypropylene, and a copolymer of polypropylene with ethylene or 1-butene.

13. The flexible pipe according to claim 2, wherein the molded electrically conductive plastic layer comprises a polyamide, selected from the group consisting of polyamide 610, polyamide 88, polyamide 8, polyamide 612, polyamide 810, polyamide 108, polyamide 9, polyamide 613, polyamide 614, polyamide 812, polyamide 128, polyamide 1010, polyamide 10, polyamide 814, polyamide 148, polyamide 1012, polyamide 11, polyamide 1014, polyamide 1212, polyamide 12, polyamide 66/6T (terephthalic acid), polyamide 6/6T (terephthalic acid), polyamide 6T (terephthalic acid) IMPMDT (2-methylpentamethylenediamine), polyamide 9T (terephthalic acid), polyamide IOT (terephthalic acid), polyamide 11 T (terephthalic acid), polyamide 12T (terephthalic acid), and polyamide 14T (terephthalic acid).

14. The flexible pipe according to claim 2, wherein the molded electrically conductive plastic layer comprises a fluoropolymer and the fluoropolymer is selected from the group consisting of a polyvinylidene fluoride (PVDF), an ethylene-tetrafluoroethylene copolymer (ETFE), an ETFE modified with propene, hexafluoropropene, vinyl fluoride or vinylidene fluoride, an ethylene-chlorotrifluoroethylene copolymer (E-CTFE), a polychlorotrifluoroethylene (PCTFE), a chlorotrifluoroethylene-perfluorinated alkyl vinyl ether-tetrafluoroethylene copolymer (CPT), a tetrafluoroethylene-hexafluoropropene copolymer (FEP) and a tetrafluoroethylene-perfluorinated alkyl vinyl ether copolymer (PFA).

15. The flexible pipe according to claim 2, wherein the molded electrically conductive plastic layer comprises a polyarylene ether ketone and the polyarylene ether ketone is selected from the group consisting of a polyether ether ketone (PEEK; formula I), a polyether ketone (PEK; formula II), a polyether ketone ketone (PEKK; formula III) and a polyether ether ketone ketone (PEEKK; formula IV):

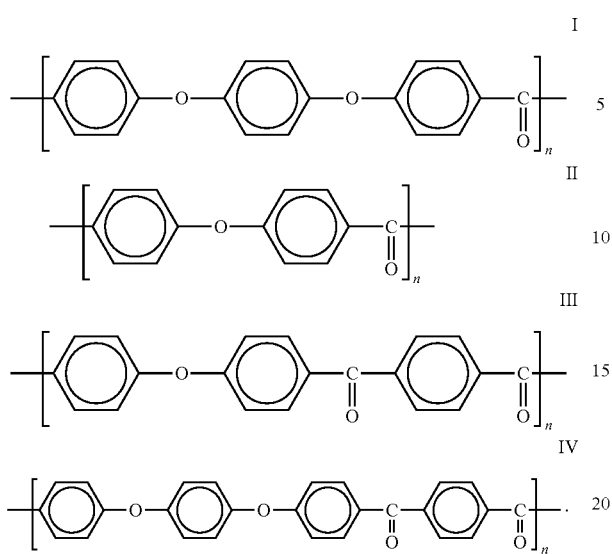
16. The flexible pipe according to claim 7, wherein an interface between the molded electrically conductive plastic layer and the inner reinforcement layer is free of bonding, and the molded electrically conductive plastic comprises an olefinic polymer.
* * * * *